US012559984B2

(12) United States Patent
Parker et al.

(10) Patent No.: US 12,559,984 B2
(45) Date of Patent: Feb. 24, 2026

(54) BOLT RESTRAINT

(71) Applicant: Surelock McGill Limited, Wokingham (GB)

(72) Inventors: Stuart Parker, Wokingham (GB); Glen Davies, Wokingham (GB)

(73) Assignee: Surelock McGill Limited, Wokingham (GB)

( * ) Notice: Subject to any disclaimer, the term of this patent is extended or adjusted under 35 U.S.C. 154(b) by 193 days.

(21) Appl. No.: 18/242,762

(22) Filed: Sep. 6, 2023

(65) Prior Publication Data

US 2024/0102319 A1 Mar. 28, 2024

(30) Foreign Application Priority Data

Sep. 23, 2022 (GB) ..................................... 2213884

(51) Int. Cl.
*E05B 63/20* (2006.01)

(52) U.S. Cl.
CPC ....... *E05B 63/202* (2013.01); *E05Y 2201/266* (2013.01); *E05Y 2201/47* (2013.01); *E05Y 2900/132* (2013.01)

(58) Field of Classification Search
CPC ...... E05B 63/202; E05B 63/20; E05B 63/185; E05B 65/1013; E05C 9/04; E05C 9/185; E05C 9/048; E05Y 2201/266; E05Y 2201/47; E05Y 2900/132; Y10T 292/54; Y10T 292/558
See application file for complete search history.

(56) References Cited

U.S. PATENT DOCUMENTS 695,642 A * 3/1902 Hearn .................... E05B 55/005 70/144
2,910,857 A * 11/1959 Muessel .............. E05B 65/1066 70/92
5,673,949 A * 10/1997 Mader ................. E05B 17/2015 292/164

(Continued)

FOREIGN PATENT DOCUMENTS

AT 330616 B * 7/1976 ........... E05C 17/446
DE 1110044 B * 6/1961 ............. E05B 63/20

(Continued)

OTHER PUBLICATIONS

Machine Translation of WO 2016162195, Google Patent, retrieved on Dec. 18, 2023.

*Primary Examiner* — Steven A Tullia
(74) *Attorney, Agent, or Firm* — Michael Hargis; Stites & Harbison PLLC

(57) ABSTRACT

A bolt restraint mechanism for restraining a bolt of a bolting mechanism. The bolt restraint mechanism includes a bolt moveable between thrown and retracted positions and a catch plate having an aperture through which the bolt extends. The catch plate is biased to pivot such that a restraint surface of the aperture pushes against the bolt to restrain movement of the bolt. A release trigger is arranged such that when depressed the release trigger pushes against the catch plate to pivot thereby releasing the restraint surface from pushing against the bolt to release the bolt. The catch plate may be biased such that when the restraint surface pushes against the bolt to restrain movement of the bolt, the catch plate is non-orthogonal to the bolt.

22 Claims, 9 Drawing Sheets

(56) References Cited

U.S. PATENT DOCUMENTS

| | | | | |
|---|---|---|---|---|
| 5,904,384 | A * | 5/1999 | Mader | E05B 17/2015 292/164 |
| 6,615,449 | B1 * | 9/2003 | Alvarez | E05C 17/30 16/80 |
| 11,702,864 | B2 * | 7/2023 | Berger | E05B 17/2053 70/336 |
| 2009/0139283 | A1 * | 6/2009 | Peng | E05B 65/1013 70/92 |
| 2019/0277064 | A1 | 9/2019 | Berger et al. | |

FOREIGN PATENT DOCUMENTS

| | | | | |
|---|---|---|---|---|
| DE | 2746049 | A1 * | 4/1979 | E05B 63/20 |
| DE | 2912881 | A1 * | 10/1980 | E05B 63/06 |
| EP | 0547746 | | 6/1993 | |
| EP | 0849425 | A1 * | 6/1998 | E05C 7/04 |
| ES | 2149062 | B1 * | 4/2001 | E05B 63/20 |
| FI | 114497 | B * | 10/2004 | E05B 59/00 |
| FR | 2476195 | A1 * | 8/1981 | E05B 63/20 |
| GB | 898841 | A * | 6/1962 | E05C 19/008 |
| GB | 2423787 | | 9/2006 | |
| WO | 2016162195 | | 10/2016 | |

* cited by examiner

Figure 6A
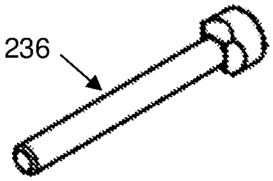
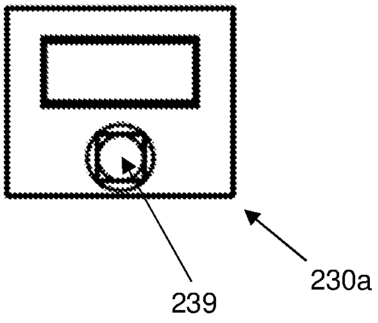
Figure 6B
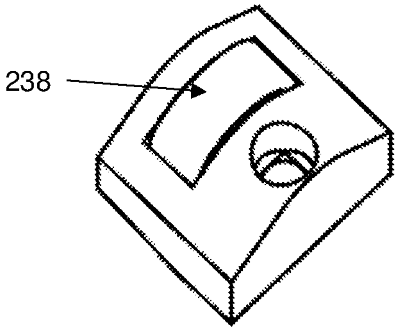
Figure 6C
Figure 7A
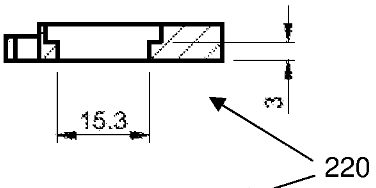
Figure 7B
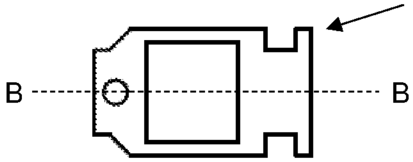
Figure 7C
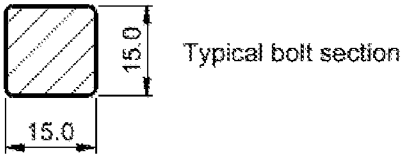

BOLT RESTRAINT

This application claims priority to United Kingdom application number 2213884.6, filed Sep. 23, 2022, the disclosure of which is incorporated herein by reference in its entirety.

TECHNICAL FIELD

The present invention relates to a bolt restraint mechanism for restraining a bolt of a single or multipoint bolting system. For example, the bolt restraint restrains a bolt in a retracted position and is released on closing a door and the bolt restraint interacting with a door frame or keep. In particular, the bolt restraint is a continuous restraint that can operate at any position on the bolt.

BACKGROUND

Commonly, bolting mechanisms providing a multi-point bolting action are used for securing hinged doors, windows, and other types of leaf mounted within a frame. A multi-point bolting action is desirable, for example, on doors at the entrances of buildings and on doors used as emergency exits. Three point bolting mechanisms are particularly common in such circumstances, but the number of bolts may vary. In a three point bolting mechanism the bolts are typically arranged to secure a closed door at the three unhinged sides, by sliding bolts into fittings into a door frame, floor, receivers or a combination of these.

A three point bolting mechanism is illustrated in FIG. 1. The bolting mechanism shown is located to one side of a door 10 for securing the door, when closed, in a frame 12. The multi-point bolting system shown in FIG. 1 comprises three bolts 14 extending from a drive mechanism 16 to each of the top, bottom and side of the door. The drive mechanism actuates the bolts. The bolts 14 extend from drive mechanism 16 to slide into holes in the door frame, floor, or into receivers. The figure shows receivers 18 for receiving the side and top bolts, and a hole 18*a* in the floor for receiving the bottom bolt. Bolt support brackets constrain the bolts to slide close to the surface of the door. Actuation of the drive mechanism 16 results in all bolts being driven into the receivers securing the door at one or more locations. Alternatively, instead of having the bolt extending from the drive mechanism 16 to the edge of the door, a pushrod may extend from the drive mechanism 16 to the bolt support bracket where the pushrod couples to the bolt.

A common problem with bolting mechanisms such as that shown in FIG. 1 is that when the door is open, the bolting mechanism does not always restrain the bolts in the retracted position, so that the bottom bolt may drag on the floor and the other bolts may interfere with the door frame during closing of the door.

GB 2423787 describes a mechanism used to retain a bolt in a retracted position, preventing reverse motion until a door is closed.

GB 2516870 describes an apparatus for constraining a reverse motion of a translating member such as a bolt. The apparatus comprises one or more blades and an arrest in the translating member or bolt. The arrest comprises one or more notches for receiving the one or more blades for restraining the bolt. Each blade is arranged to engage, move or slide progressively across or along the arrest in a direction transverse to the simultaneous movement of the bolt in a direction of translation, to prevent reverse movement of the bolt over a range of bolt positions.

The apparatuses of the prior art require the bolt to be modified to include a notch or arrest and the restraint only operate on this region of the bolt, albeit a wide region for the case of the arrest of GB2516870.

SUMMARY OF THE INVENTION

The present invention provides a bolt restraint mechanism for restraining a bolt of a bolting mechanism, the bolt restraint mechanism comprising: a bolt moveable between thrown and retracted positions; a catch plate having an aperture through which the bolt extends, the catch plate biased to pivot or rotate such that a restraint surface of the aperture pushes against the bolt to restrain movement of the bolt; and a release trigger arranged such that when depressed the release trigger pushes against the catch plate to pivot releasing the restraint surface from pushing against the bolt, for example, to release the bolt. The catch plate may alternatively be known as a restraint plate. When the release trigger presses on the catch plate or restraint plate to release the bolt, the catch plate is moved to a release position. The bolt does not require any adaption such as cuts outs, notches or teeth to be restrained by the mechanism. For example, the bolt may have continuous and smooth sides against which the catch plate operates. The aperture in the catch plate may be of a similar shape and size to, but slightly larger than, the cross-section of the bolt. The pivot of the catch plate may be provided towards one end of the catch plate.

The catch plate, in its rest or restraining position, may be angled across the bolt and, on release, the catch plate moves closer to an orthogonal or transverse crossing of the bolt. In more detail, the catch plate may be biased such that when the restraint surface pushes against the bolt to restrain movement of the bolt, the catch plate is non-orthogonal to the bolt, that is the catch plate crosses the bolt at an angle offset from the orthogonal or transverse direction. By non-orthogonal to the bolt we mean non-orthogonal to the length or longitudinal direction of the bolt. Written another way, the catch plate may be biased away from being orthogonal to the bolt and to push the restraint surface towards the bolt. In this way the restraint surface may grip or pinch the bolt. The catch plate may be biased so as to pivot away from orthogonal and in the direction in which the bolt is thrown. The gripping or pinching of the bolt by the catch plate may be to restrain the bolt from moving in the thrown direction. With the direction of bias the same as the direction of throwing the bolt, the catch plate may grip the bolt tighter the more the bolt attempts to be thrown, unless released by the trigger. In the direction of retraction of the bolt, the catch plate may allow the bolt to pass with relative ease, for example, because the direction of retraction is also the direction of release of the catch plate from gripping the bolt.

The release trigger may be arranged such that when depressed the release trigger pushes against the catch plate to pivot the catch plate towards crossing the bolt at an orthogonal angle.

When the catch plate restrains movement of the bolt the catch-plate may be at an angle of up to 15 degrees, such as between 5 and 15 degrees, to orthogonal to the bolt. Preferably the catch plate may be at an angle of up to 10 degrees to orthogonal to the bolt, or is at angle of between 5 and 10 degrees to orthogonal to the bolt.

The catch plate may be arranged to pivot or rotate and further may be arranged with limited translational movement, such as relative to a housing of the bolt restraint mechanism. The catch plate may comprise a first male or female pivot member, and a housing of the bolt restraint mechanism may comprise an opposing second female or male pivot member, and the first and second pivot members may loosely fit together to permit rotational and limited translational movement of the catch plate relative to the housing. This allows the lateral position of the catch plate to float for optimal gripping of both sides of the bolt. The catch plate may comprises one or two tangs, each tang located in a hole in the housing for rotational and limited translational movement of the catch plate relative to the housing.

The restraint surface of the catch plate is a first restraint surface, and the catch plate may be further arranged for rotational and translational movement such that a second restraint surface opposite to the first restraint surface of the aperture may push against the bolt to restrain movement of the bolt. The second restraint surface may push against an opposing side of the bolt to the first restraint surface. The restraint surface or surfaces may be inside surface(s) of the aperture.

The catch plate may have a pivot axis and the aperture in the catch plate, for example measured in a direction parallel to the plane of the catch plate, may have a size or width transverse to the pivot axis which is greater than the width of the bolt at the aperture by an amount of no more than 1.0 mm. Preferably, depending on the size of the bolt, the aperture may be bigger than the width of the bolt by no more than 0.5 mm or no more than 0.3 mm.

The restraint surface or surfaces of the aperture may comprise a stepped surface.

The catch plate may be biased at an end opposed the pivot.

The release trigger may extend beyond the housing of the bolt restraint mechanism to be depressed or acted on by a door frame, strike-plate or keep.

The release trigger may comprise a first end, or strike end, extending from the housing of the bolt restraint mechanism and a second end, or release end, arranged to push against the catch plate. The release trigger may be arranged for compression between the first end and second end and may be biased towards an uncompressed or extended length. The release trigger may comprise one or more springs between the first and second ends for biasing the release trigger to the uncompressed or extended length.

The release trigger may comprise a roller as the contact surface for depression of the release trigger such as by a door frame, receiver or strike-plate.

The uncompressed or extended length of the release trigger is adjustable, such as by rotation of a fastener.

The release trigger may comprise an adjustment screw or adjustment bolt and optionally an adjustment rod into which the adjustment screw or bolt couples or fastens. One of the adjustment screw, adjustment bolt or adjustment rod may comprise a head with chamfered surfaces, the head received in a hole with a plurality of chamfered countersink surfaces such that the adjustment screw, adjustment bolt or adjustment rod is keyed or guided to a limited number of orientations, thereby providing a step-wise adjustment of the length of the release trigger.

The bolt may have a square or rectangular cross-section and may have a length of a side of between 15.0 and 16.0 mm.

The present invention further provides a bolting mechanism comprising the bolt restraint mechanism described above. The bolting mechanism may be a multipoint bolting mechanism and the bolt may be a bolt of the multipoint bolting mechanism.

The present invention further provides a door or leaf comprising the bolt restraint mechanism set out above or the bolting mechanism set out above. The door or leaf may be mounted in a frame having a receiver, keep or strike plate for receiving the bolt.

There is further provided a universal restraint mechanism for restraining a translatable member, the restraint mechanism comprising: a translatable member moveable between thrown and retracted positions; a catch plate having an aperture through which the translatable member extends, the catch plate biased to pivot or rotate such that a restraint surface of the aperture pushes against the translatable member to restrain movement of the translatable member; and a release trigger arranged such that when depressed the release trigger pushes against the catch plate to pivot releasing the restraint surface from pushing against the translatable member, for example, to release the translatable member. Features of the catch plate and restraint trigger set out above in relation to the bolt restraint mechanism may be applied to the universal restraint mechanism.

BRIEF DESCRIPTION OF THE DRAWINGS

Embodiments of the present invention, and aspects of the prior art, will now be described with reference to the accompanying drawings, of which:

FIG. 6A is a perspective view of the shaft of the release trigger;

FIG. 6B is an end plan view of the first end of the release trigger; and

FIG. 6C is a perspective view of the first end of the release trigger;

FIG. 7A is a cross-section view of the catch plate taken along the line B-B of FIG. 7B;

FIG. 7B is a plan view of the catch plate; and

FIG. 7C is a cross-section view of the bolt;

DETAILED DESCRIPTION

Figure 1:
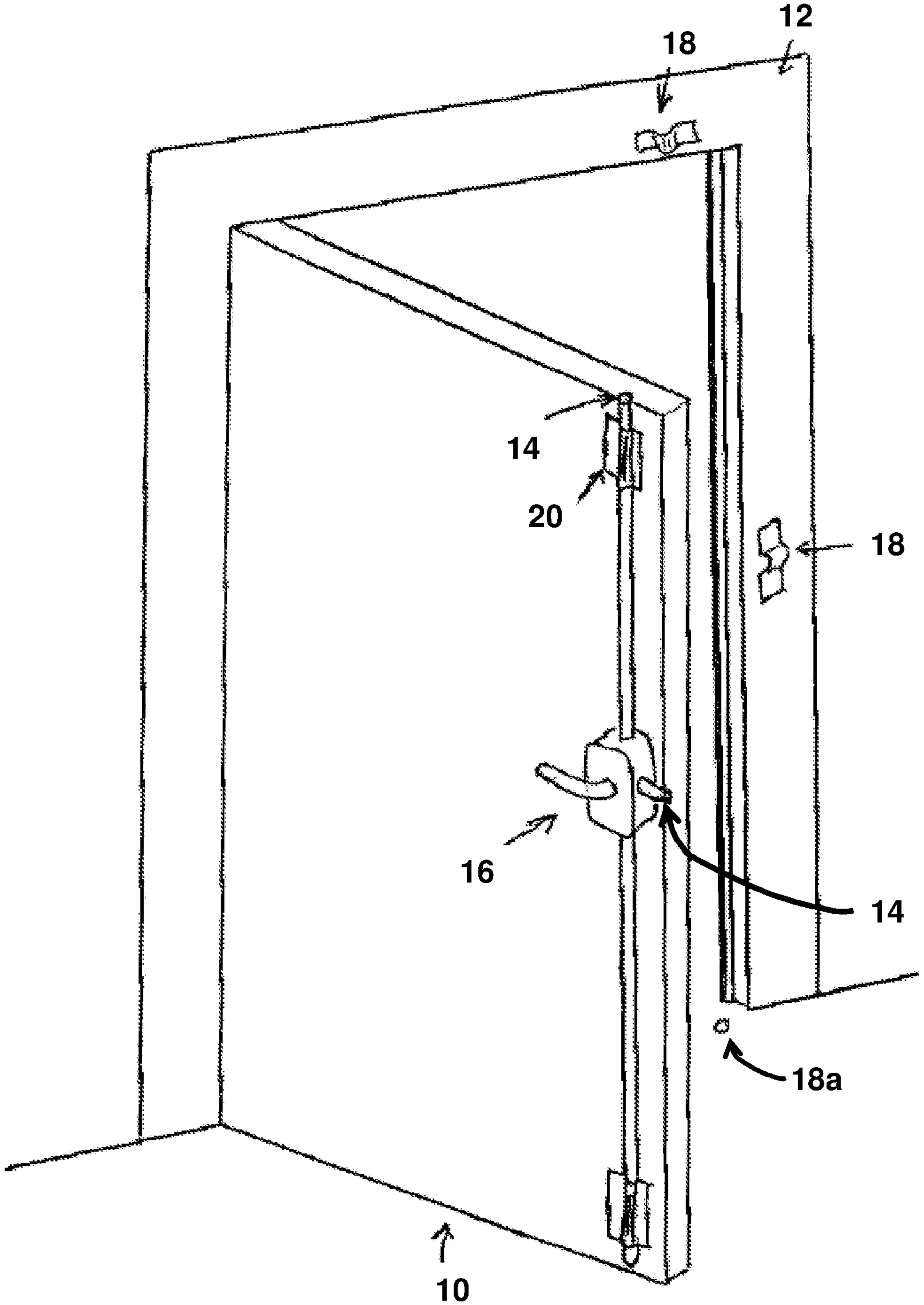
FIG. 1 is perspective drawing of a door having a multipoint bolting mechanism according to the prior art.
Figure 2:
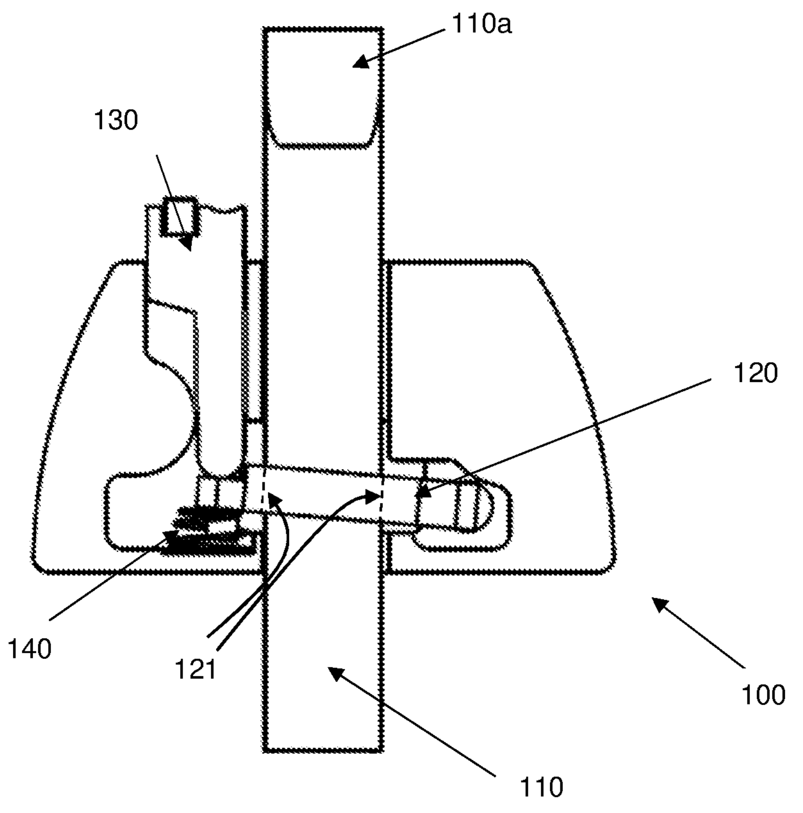
FIG. 2 is a plan view of a bolt restraint mechanism according to an embodiment of the present invention.

FIG. 2 is a plan view of a bolt restraint mechanism 100 according to the present invention. The bolt restraint mechanism comprises a bolt 110 which passes through an aperture in the bolt restraint mechanism. The bolt 110 may be a bolt of a multi-point bolting system such as bolt 14 of FIG. 1, or may be driven by a push rod such as extending from a drive mechanism such as bolt drive mechanism 16 of FIG. 1. The bolt is movable such as by the drive mechanism between thrown and retracted positions. In the thrown position a tip 110*a* of the bolt may extend beyond a housing of the bolt restraint mechanism such as into a hole in a door frame, or into a receiver or keep to secure a door or leaf. The bolt restraint mechanism further comprises a catch plate 120. The catch plate has an aperture through which the bolt extends. The aperture is preferably slightly larger than the cross-section of the bolt. The catch plate is arranged to pivot, such as at one end, such that the angle at which the bolt passes through the aperture in the catch plate can be varied. The edges of the aperture in the catch plate form one or more restraint surfaces that, depending on the angle between the catch plate and bolt, may push against the bolt to pinch or grip the bolt. When one or more of the restraint surfaces pushes against the bolt, they prevent the bolt from being moved or translated along its length. Preferably, the restraint surfaces provide a relatively greater restraining force in the direction of throwing the bolt. In FIG. 2, edges of the aperture are shown by dashed lines 121. The restraint surface or surfaces meet the bolt at a non-zero angle to a direction orthogonal to the bolt. The bolt restraint mechanism further comprises a release trigger 130. The release trigger, which may also be considered to be a trigger finger, is arranged such that when depressed it pushes against the catch plate to pivot the catch plate. This pivoting changes the angle the catch plates 120 meets or crosses the bolt. When the release trigger 130 pushes against the catch plate the catch plate is pushed closer to an orthogonal crossing direction to the bolt. This effectively widens the cross-sectional size of the aperture across the bolt, releasing the restraint surface from pushing against the bolt. The restraint trigger or finger may extend from a housing of the restraint mechanism. When the door or leaf, to which the restraint mechanism is attached, is closed the release trigger 130 will strike the door frame or receiver pushing the protruding part of the release trigger at least partly into the housing. This action releases the catch plate from restraining the bolt. The bolt 110 can now be thrown to a locked or secured position in the receiver or hole in to secure the door or leaf closed. The catch plate is biased, such as by spring 140 in FIG. 2. The bias causes the catch plate 120 to be pushed towards a non-orthogonal angle to the bolt, effectively closing the size of the aperture such that the restraint surface or surfaces push against the bolt.

As shown in FIG. 2, the bolt may comprise a chamfered or angled tip 110*a* to encourage engagement in receiver or hole as the bolt is thrown. For example, on actuation of a bolt without the chamfer would require precise alignment of the bolt with the hole or require a hole or receiver that is larger than the bolt to avoid such precise alignment. A hole or receiver that is larger than the bolt will allow the bolt and hence a door or leaf which it is securing to move a limited amount even when secured, which is undesirable. The chamfered or angled tip allows some misalignment between the hole or receiver and bolt, and upon driving of the bolt into the receiver or hole, the chamfer guides the bolt into the hole or receiver and may also pull the leaf or door fully closed.

Figure 3:
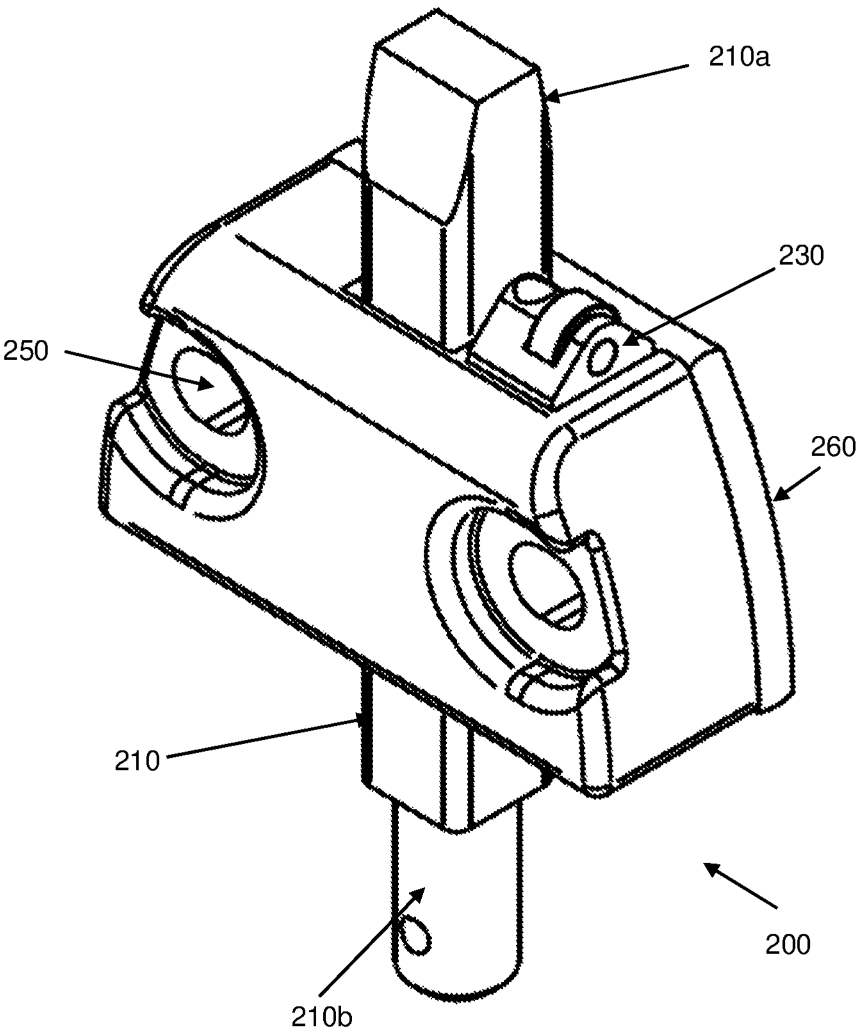
FIG. 3 is a perspective view of a bolt restraint mechanism according to an embodiment of the present invention.

FIG. 3 is a perspective view of a bolt restraint mechanism 200 according to an embodiment of the present invention. The bolt restraint mechanism 200 comprises bolt 210 corresponding to bolt 110 of FIG. 2. The mechanism further comprises catch plate 220 (not shown) similar to catch plate 120 and release trigger 230 corresponding to release trigger 130. The bolt 210 may further comprise a portion 210*b* for connection to a push rod which is driven by a drive mechanism such as drive mechanism 16 of FIG. 1. Portion 210*b* may be a narrower cross-section portion extending from the end of the bolt, for connection to a push rod. For example, as shown in FIG. 3 the bolt 210 has a square or rectangular cross-section which extends from the tip 210*a* that is to be received in a receiver through the bolt restraint mechanism. The portion 210*b* is circular in cross-section and has a diameter that is less than the lengths of the sides of the square or rectangular cross-sectional dimensions. This allows a push rod to slide over the portion 210*b* while not exceeding the cross-sectional dimensions of the bolt. The portion 210*b* may also comprise a hole or fixing for securing the push rod to the bolt for driving the bolt.

The bolt restraint mechanism 200 further comprises a housing 260. The bolt 210 extends through the housing 260 from one side to the other. The housing 260 further comprises mounting holes 250 for mounting the bolt restraint mechanism to the door or leaf the bolt is securing. In the embodiment of FIG. 3 the housing comprises two holes for receiving fixings such as screws or bolts for mounting the bolt restraint mechanism to a door or leaf. The housing 260 may be formed of two parts which may be a relatively flat back-plate and a front part.

Figure 4:
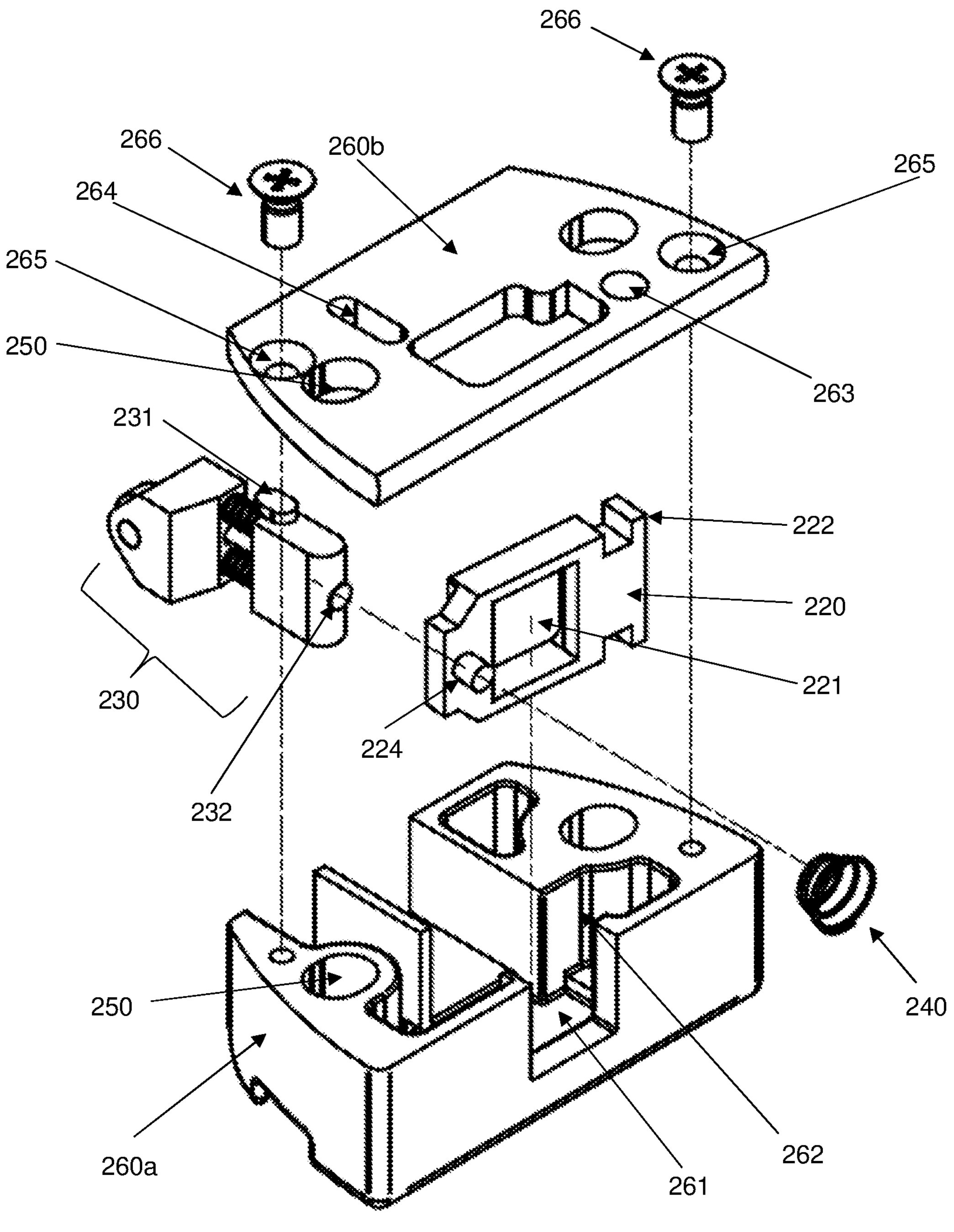
FIG. 4 is an exploded perspective view of the embodiment of FIG. 3 (bolt not shown)

FIG. 4 is an exploded perspective view of the embodiment of FIG. 3. In FIG. 4 the bolt 210 is not shown. The housing and other features of the bolt restraint mechanism are shown in FIG. 4. The relatively flat back-plate of the housing is indicated by reference number 260*b* with the front part of the housing indicated by 260*a*. The back-plate 260*b* is affixed to the front part 260*a* of the housing by fixings such as screws 266 through holes 265. In the embodiment shown there are two such fixings located at opposite corners of the housing. Preferably the fixings are flush or recessed in to the back-plate such that the back-plate can fit flat against the surface of a door or leaf. In FIG. 4, screws 266 fit in countersunk holes 265 in back-plate and fix into corresponding threaded holes in the front part of the housing 260*a*. The fixings couple the back-plate 260*b* and front part of the housing 260*a* together.

The front part 260*a* of the housing includes a channel 261 through which the bolt 210 extends. With the back-plate of the housing attached the channel 261 forms an aperture. The aperture extends from one side of the housing part 260*a* to another side, for example from a bottom side to a top side. The aperture and/or channel 261 is rectangular or square in cross-section corresponding to the cross-sectional shape of the bolt 210. The front part of the housing also comprises an aperture into which is mounted the catch plate 220. The mounting holes 250 for receiving the fixing can also be seen in the front part of the housing.

FIG. 4 also shows the catch plate 220. The catch plate has aperture 221 through which the bolt 210 extends. One or more edges of the aperture 221 in the catch plate are restraint surfaces which provide the restraining or gripping action on the bolt. To achieve this the size and shape of the aperture is similar to the cross-sectional shape of the bolt but slightly larger. The aperture 221 should be large enough that the bolt 210 can pass through unhindered when the catch plate 220 is orthogonal to the bolt 210 but restricts movement of the bolt when the catch plate is a small number such as 5 or 10 degrees away from the orthogonal. Catch plate 220 further comprises one or more tangs which act as a pivot about which the catch plate rotates or turns. In the embodiment of FIG. 4 the catch plate comprises a pair of tangs 222 and the catch plate is generally flat. The tangs are provided towards one end and on opposite edges of the catch plate. One of the tangs locates in hole 263 in back-plate of housing, whereas the other of the tangs locates in a similar hole or recess (not shown in FIG. 4) in front part of the housing 260*a* in the base of the aperture 262. Catch plate 220 may be biased in the housing in a direction away from an orthogonal crossing of the bolt. In the embodiment of FIG. 4 the bias is provided by coiled spring 240 which may be a compression spring. Catch plate may further comprise protrusion or nub 224 on to which the spring locates. The spring is located between a wall of the front part of the housing and the end of the catch plate distal to the pivot and tangs. Other types of spring or bias and various different arrangements may be alternatively used.

The release trigger 230 is shown in FIG. 4. The release trigger is disposed in an aperture in the housing. In the embodiment of FIG. 4, a locating peg 232 at the interior end of the release trigger locates in a recess in the catch plate to guide location of the catch plate 220 and release trigger 230 together. Alternatively, the peg 232 may be a magnetic disc and the catch plate 220 may be made of a ferromagnetic material such as mild steel. The magnetism between the peg 232 and catch plate keeps the release trigger 230 in contact with the catch plate and prevents it from drifting into and out of the housing. Release trigger 230 comprises a guide 231 which locates in slot 264 in back-plate of housing. A corresponding slot or channel is provided in front part of housing (not shown in FIG. 4). As the release trigger is pushed to release the catch plate 220 sliding movement of the release trigger 230 is guided by the guide 231 in slot 264. Further details of the release trigger 230 are shown in FIGS. 5A-5C.

Figure 5A:
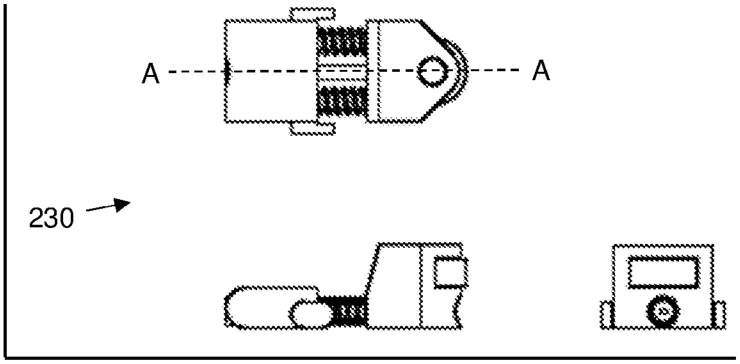
FIG. 5A includes respectively plan and front views of the release trigger.
Figure 5B:
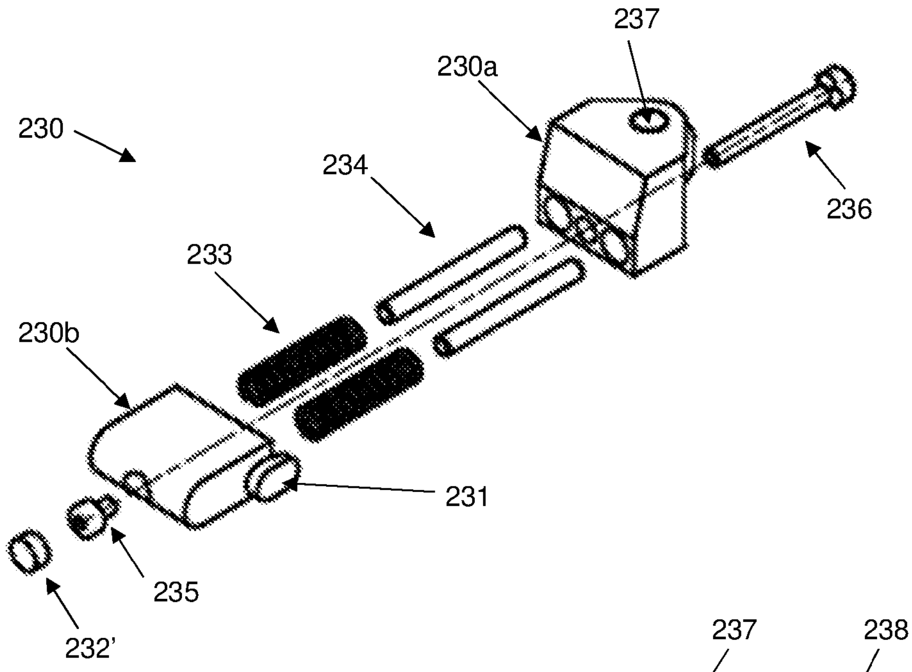
FIG. 5B is an exploded perspective view of the release trigger.
Figure 5C:
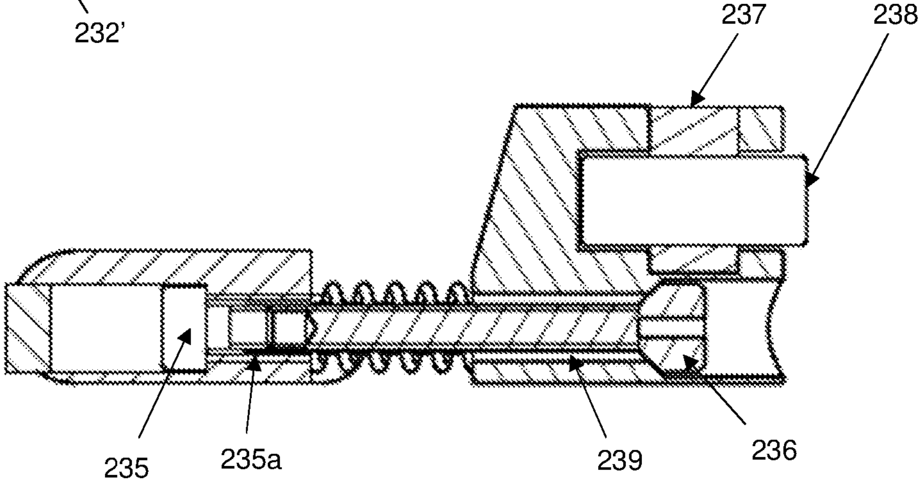
FIG. 5C is a cross-sectional view of the release trigger.

FIG. 5A shows top plan, side plan and front views of the release trigger 230. FIG. 5B is an exploded perspective view of the release trigger 230. FIG. 5C is a cross-section through the release trigger 230 along the line A-A in FIG. 5A. The release trigger 230 is formed of a first end, or strike end, 230*a* which extends from the housing to strike, or be acted on by, a door frame or receiver assembly to release the catch plate. The release trigger 230 further comprises a second end, or release end, 230*b* for pushing against the catch plate 220 and releasing it. The release trigger 230 is compressible and, for example, comprises one or more spring elements between the first end 230*a* and second end 230*b*. FIG. 5*b* shows two spring elements 233. To guide the direction of compression of the spring elements 233, the spring elements are coiled springs and rods 234 are arranged along the axis and through the core of the springs. First end and second ends of the release trigger 230 have holes into which the rods are received. Spring elements 233 are arranged along the rods between the first end and second end. The first end 230*a* and second end 230*b* are spaced apart by the spring elements but coupled together by a fastener arrangement. In the embodiment of FIGS. 5*a-c*, the fastener arrangement comprises a threaded shaft or bolt 236 with head, and screw 235 such as a cap head screw or machine screw. The shaft 236 extends through clearance hole 239 in the first end 230*a* with the head of the shaft or bolt 236 in a recessed or counterbore part of hole 239. The shaft or bolt 236 screws into a threaded hole 235*a* in second end 230*b* and may be secured in that hole by glue. Head of the screw 235 sits in a recessed or counterbore hole in the second end 230*b*. The recessed or counterbore hole meets, or is part of, the same hole as the threaded hole 235*a* into which the shaft or bolt 236 screws. The head of the shaft 236 is guided or keyed to a limited number of orientations by chamfered surfaces. This prevents the shaft 236 from undoing from the threaded hole 235*a*. The rotational setting or position of the shaft 236 provides for any adjustment of the length of the release trigger by winding the shaft into or out of the hole 235*a*, and as will be described further in the following paragraph the chamfered surfaces limit the adjustment to a stepwise or stepped adjustment. The cap head screw or machine screw 235 may be glued into a threaded hole in the end of shaft or bolt 236. This prevents the shaft or bolt 236 from being completely unscrewed from the second end 230*b*, because the head of the screw 235 acts as stop against the recess or counterbore.

FIG. 6B shows in more detail the first end 230*a* of the release trigger. FIG. 6A is a perspective view of the shaft or bolt 236. FIG. 6B is an end plan view of the first end 230*a*. FIG. 6C is a perspective view of the first end 230*a*. The chamfered keying or guiding surfaces on the head of the shaft 236 can be seen in more detail in FIG. 6A. The underside of the head has a number of chamfered surfaces, such as four. The recessed or counterbore hole 239 is shown in more detail in FIG. 6B. Where the counterbore meets the through hole the annular surface is also chamfered to provide a corresponding number of surfaces as the shaft head, in this case four. The chamfered annular surface is formed by casting. When the shaft is inserted in to hole 239 and tightened in position, the cooperating chamfered surfaces on the shaft head and counterbore cause the shaft head to be guided or keyed to four rotational positions 90 degrees apart. With the first end 230*a* and second end 230*b* biased apart under spring tension of springs 233, the chamfered surfaces provide a detent that prevents the head of the shaft or bolt 236 from rotating under vibration and altering the adjustment. The shaft 236 and screw 235 may have hexagonal drive recesses for receiving and being tightening by hex-head based tools such as a hex key or Allen key.

Returning to FIG. 5B, the counterbore hole in the second end 230*b* is covered by a disc 232'. The disc 232' forms peg 232 extending a small amount from the surface of the second end 230*b*. As mentioned, the peg 232 may be a magnet such as magnetic disc. The magnet may be glued to the rear end of second end 230*b* and provides a connection between trigger 230 and 220.

First end 230*a* also includes a roller 238 configured to rotate. The roller is held in position by pillar 237. The roller rotates when in contact with, for example, a door frame or bolt receiver, and eases the movement of the bolt restraint against the door frame or bolt receiver as the door is closed.

FIGS. 7A-C show the catch plate 220 in more detail along with a cross-section of the bolt 210. FIG. 7A shows a cross-section of the catch plate taken along the line B-B in FIG. 7B. FIG. 7B is a plan view of the catch plate. FIG. 7C is a cross-section of the bolt. We have previously described the catch plate 220. FIG. 7A provides example dimensions of the hole in the catch plate in relation to the cross-sectional size of the bolt which is provided in FIG. 7C. For a bolt with a square cross-section of side 15.0 mm the dimension of the aperture in the B-B direction is preferably 15.3 mm. The bolt may have rounded corners or edges. As can be seen in FIG. 7A the aperture may have stepped edges. These will be discussed in more detail in the following as we discuss operation of the bolt restraint mechanism. The stepped edges help the aperture of the catch plate act on two opposing sides of the bolt thereby improving restraint. As can be seen in FIG. 7B, the thickness of the narrowest part of the catch plate adjacent to the aperture is 3 mm. This may correspond to approximately half of the thickness of the catch plate. FIG. 7A shows the dimension of the aperture in the B-B direction, which is orthogonal to the pivot axis. The dimension of the aperture in the other direction, that is in the direction parallel to the pivot axis may be different and as shown in FIG. 7B it may be larger than the dimension in the B-B direction. With the difference between the bolt cross-sectional size and the aperture being small at only 0.3 mm we should also consider manufacturing tolerances. For the 15.0 mm bolt this is square stock material and is consistently at 15.0 mm. The aperture is machined to +1-0.1 mm which results in an aperture of 15.2 to 15.4 mm. Instead of being based on a 15 mm bolt, other dimensions of bolt and catch plate aperture are possible. For example, a 25 mm cross-section or side dimension of bolt may be used. The above dimensions are provided as examples.

We now describe operation of the bolt restraint mechanism with reference to FIGS. 8, 9A-9D, and 10A-10B.

Figure 8:
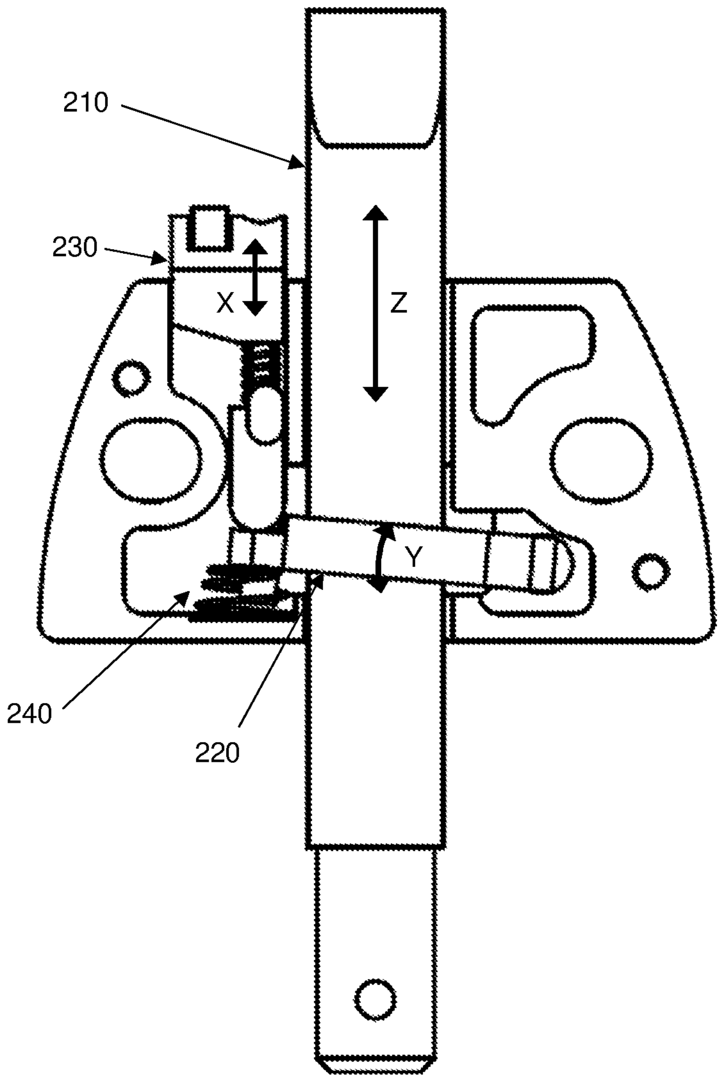
FIG. 8 is a plan view of the bolt restraint mechanism according to an embodiment of the invention, including the bolt but with part of the housing of the bolt restraint mechanism removed.

FIG. 8 is a plan view of the bolt restraint mechanism including the bolt 210 but with part of the housing of the bolt restraint mechanism removed. The release trigger 230 on hitting a door frame or bolt receiver is pushed downwards as shown by the arrow X. The downward movement of the release trigger 230 pushes on catch plate 220. The catch plate is pivoted as shown by arrow Y against the bias provided by spring 240. As a result of the pivoting, the catch plate is moved closer to being orthogonal to the bolt. In other words, the angle the catch plate 220 makes with the bolt becomes closer to orthogonal. With the catch plate closer to orthogonal, the aperture in the catch plate is also closer to orthogonal making the effective aperture in the cross-sectional direction of the bolt seem larger. Hence, the effectively larger aperture results in the bolt 210 being released from the catch plate 220 such that it is free to translate in the direction of arrow Z. A drive mechanism such as drive mechanism 16 in FIG. 1 can now operate to translate the bolt 210 or move push rods to translate the bolt 210. The bolt can be operated to be slid into receiver or door frame to secure the door closed.

Retraction of the bolt to open the door or leaf is largely the opposite of the process for throwing the bolt to secure the door or leaf. With the door or leaf closed, the release trigger 230 is already pushed downwards such that on actuation by bolt drive mechanism such as bolt drive mechanism 16, the catch plate 220 is not acting on the bolt 210 and the bolt is free to be retracted to open the door or leaf. Once the door or leaf has opened such that release trigger has cleared the door frame or receiver, the release trigger 230 will be released and be pushed upwards by the bias on catch plate 220. The increasing non-orthogonality the catch plate makes with the bolt, will cause the edges of the aperture of the catch plate to push against the sides of the bolt and restrain the bolt in the retracted position. Although we have described the bolt restraint mechanism operating on a bolt that moves upwards to secure a door, for example, at the top of a door, the bolt restraint mechanism may alternatively be arranged to operate on a bolt 210 moving in other directions for securing other parts of the door such as the side or bottom of the door.

Figure 9A:
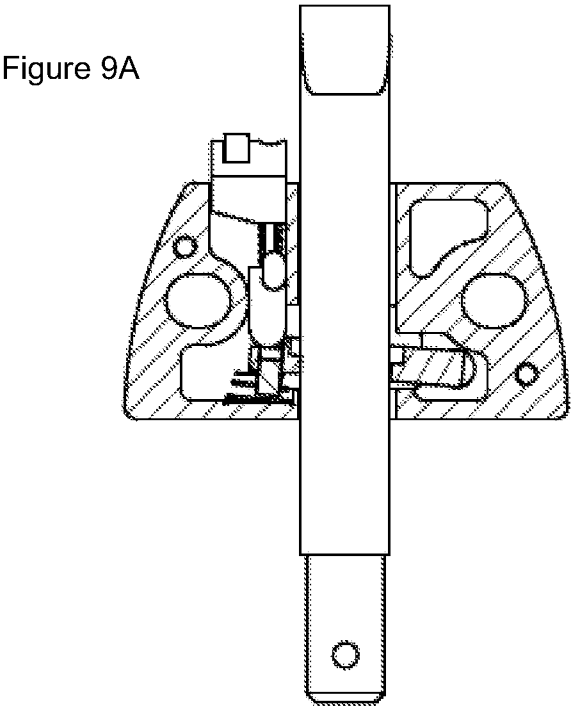
FIG. 9A is a sectional view through the bolt restraint mechanism with the catch plate respectively restraining the bolt and in the release position.
Figure 9C:
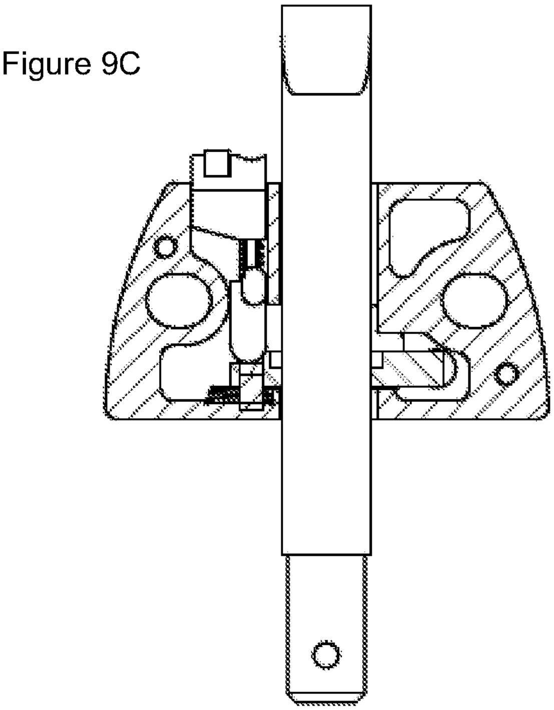
FIG. 9C is another sectional view through the bolt restraint mechanism with the catch plate respectively restraining the bolt and in the release position.
Figure 9B:
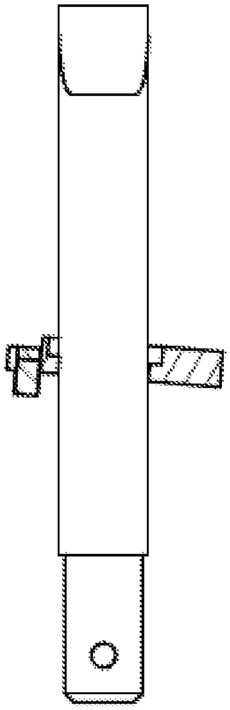
FIG. 9B shows only the catch plate and bolt again respectively with the catch plate restraining the bolt and in the release position.
Figure 9D:
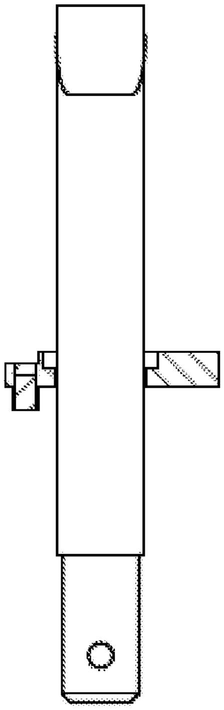
FIG. 9D shows only the catch plate and bolt again respectively with the catch plate restraining the bolt and in the release position.
Figure 10A:
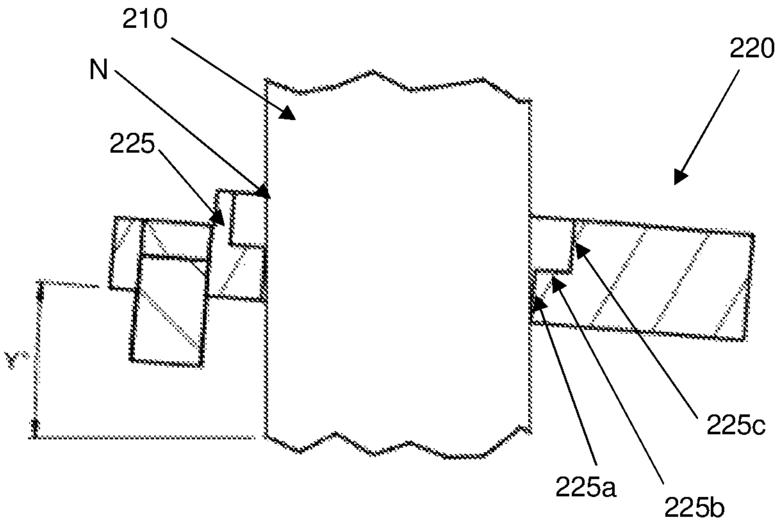
FIGS. 10A and 10B include enlarged views of the interaction between the catch plate surfaces and the bolt for restraint and release positions corresponding to FIGS. 9B and 9D.
Figure 10B:
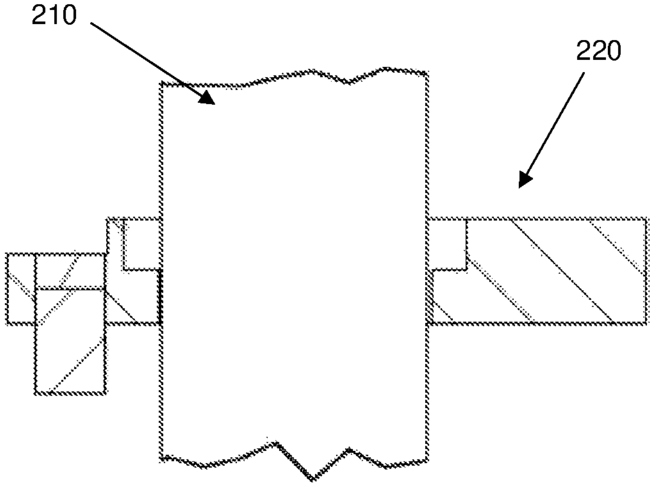

FIGS. 9A-9D and 10A-10B show in more detail operation of the bolt restraint mechanism on a bolt. FIG. 9A is a sectional view through the bolt restraint mechanism with the catch plate restraining movement of the bolt. FIG. 9B shows only the catch plate and bolt, again with the catch plate restraining the bolt. FIG. 9C is a corresponding sectional view through the bolt restraint as FIG. 9A but the catch plate is in a release position no longer restraining the bolt and thereby allowing movement of the bolt. FIG. 9D is similar to FIG. 9B showing only the catch plate and bolt, but here the catch plate is in the release position. FIGS. 10A and 10B are enlarged views of the interaction between the catch plate surfaces and the bolt for restraint and release positions of the catch plate corresponding to FIGS. 9B and 9D.

In FIGS. 9A and 9B, as discussed above, the release trigger is released and the catch plate restrains the bolt. As discussed in relation to FIG. 7A, the aperture in the catch plate has stepped edges. The stepped edges are shown in more detail in FIGS. 10A and 10B. The edges of the aperture in the catch plate 220 restrain the bolt when the catch plates is at a non-orthogonal angle to the bolt. The catch plate moves about a pivot and may make an angle Y° to an orthogonal direction to the bolt. The stepped edges 225 are provided on edges parallel to the pivot axis. The stepped edges provide a narrower aperture when viewed from one side of the catch plate compared to the other. When the catch plate is pivoted away from the orthogonal to the bolt, one side of the catch plate faces towards the orthogonal whereas the other side faces away. The side having the narrower aperture is that facing the orthogonal. The stepped edges are formed between opposing surfaces of the substantially flat catch plate. To use terminology from staircases, a stepped edge comprises a first riser 225*a*, a platform 225*b* and a second riser 225*c*. As shown in FIG. 10A, the first riser 225*a*, platform 225*b* and the second riser 225*c* are mirrored on the opposing side of the aperture.

The first risers 225*a* form the narrowest part of the aperture. As shown in FIG. 10A, with the catch plate 220 at the position shown, the first risers contact the bolt and provide a restraining or gripping force on the bolt. In the figure, the left hand side of the bolt is restrained by the top part of the riser 225*a*, towards the corner with the platform 225*b*. The right hand side of the bolt is restrained by the lower part of the opposing riser 225*a*, towards the corner with the outer face of the catch plate, which in the figure is the lower surface. The wider part of the aperture is formed by the second risers 225*c*. As can be seen in the figure at region N, this wider part of the aperture accommodates the bolt, allowing it to contact the top of the riser. In other embodiments the aperture may not include stepped edges but in such a case the catch plate would need to be thinner, the aperture larger or the amount of rotation about the pivot would need to be reduced. The edges of the aperture also may wear and for this reason it is desirable for a greater angle of movement of the catch plate to be possible. Without the stepped edges this would require a thinner catch plate but this may reduce the robustness of the bolt restraint. Hence, the stepped edge to the aperture allows an increased amount of pivot while keeping the catch plate to be sufficiently thick to be robust. In an embodiment, the catch plate is 5 mm thick so as to make the plate sufficiently robust that it is unlikely to flex or bend. Flexing or bending may allow the bolt to slip. The narrower part of the aperture formed by stepped edges 225 is thinner, having a 3 mm thickness, to achieve a preferred angle of pinching or gripping the bolt.

FIG. 10A shows the angle Y° between the catch plate and the direction orthogonal to the bolt. The angle Y° may be around 5°. As discussed previously, tangs 222 of catch plate 220 may locate in holes in the housing such as hole 263 in back plate 260*b*. The tangs rotating in holes provide the pivot for the catch plate. If the holes are provided as a close fit to the size of the tangs, the tangs are constrained so that they are only able to rotate. If the diameter of the holes is slightly larger than the size of the tangs, the catch plate will also be able to move laterally. This has advantages in allowing the catch plate to move to, or float, to the best position in which both restraint surfaces of the aperture may contact and restrain the bolt. Without lateral movement to the catch plate, only one restraint surface of the aperture may restrain the bolt and this results in a less secure restraining of the bolt. Taking into account that the catch plate may move laterally, or float, to a position for restraining the bolt using both restraint surfaces, the angle Y° is slightly larger such as by 1-2°, at around 7°. As items in the restraint mechanism wear, more rotation of the catch plate 220 may be needed to grip the bolt, such as up to 10° or 15°. Preferably, overall the angle Y° may be in the range 4° to 10° but is more preferably in the range 5° to 8°.

FIG. 10B shows the catch plate in a position in which the release trigger 230 has been depressed to allow release of the bolt. The catch plate 220 is pivoted towards being orthogonal to the bolt. In the figure the catch plate is shown as being orthogonal to the bolt. If the pivot allows translation of the catch plate, as described above, then the catch plate can slide such that both of the restraint surfaces or edges of the aperture release the grip on the bolt. Without this lateral translation of the catch plate one of the restraint surfaces may continue to be close to or touching the bolt. For example, if the end of the bolt is held in a door frame or receiver which causes the bolt position to be pushed sideways, a restraint surface may continue to hinder retraction of the bolt even when the catch plate has been pivoted to the release position. By allowing the catch plate to move laterally, or float, this problem is avoided.

We now return to discuss the release trigger 230 in more detail. In FIG. 5B the release trigger is shown as having first and second ends 230*a*, 230*b*, coupled together by one or more springs. The springs 233 are relatively stiff springs, being stiffer than spring 240 that biases the catch plate. As the release trigger is depressed, the initial depression causes the release trigger to push on the catch plate and release the bolt. Once the catch plate has been fully pivoted to release the bolt, which may for example be when the catch plate is orthogonal to the bolt, further depression of the end of the release trigger causes the springs 233 to be compressed shortening the distance between the first and second ends 230*a*, 230*b*, of the release trigger. This allows for some variation in the fitting of the receiver or closeness to the door frame into which the bolt is thrown. For example, some doors or leaves may be looser fitting to the frame which would result in less depression of the release trigger while others may be a closer fit resulting in greater depression of the release trigger. Although the amount the release trigger extends from the housing of the bolt restraint mechanism may be adjusted by the shaft 236 and screw 235 such that the release trigger is always triggered sufficiently by the closing of the door or leaf, the amount the release trigger moves may vary. The springs between the two ends of the release trigger allow the compression of the release trigger to accommodate such variability in the amount the release trigger is depressed.

The springs 233 provide some dampening or cushioning against sudden closing of the door or leaf which could result in over-compression of the release trigger. This helps to prevent shock or damage to the trigger and catch plate. The springs 233 also bias the first end 230*a* and second end 230*b* apart. The bias allows adjustment, by rotation of bolt or shaft 236, to be made of the projection of the first end 230*a* for correct striking against a receiver or door frame.

FIG. 5C shows the shaft 236 and screw 235 of the release trigger in the hole 239. When the release trigger is compressed the length of the hole is sufficient that the shaft 236 and screw 235 do not extend out of the bore, preventing damage to the catch plate at one end and to a door frame, strike-plate or receiver at the other end.

The person skilled in the art will readily appreciate that various modifications and alterations may be made to the above described bolt restraint mechanism. The modifications may be made without departing from the scope of the appended claims. For example, the bolt restraint mechanism is applicable to a bolt for securing parts of a door or leaf other than the top of the door, for example, the side or bottom of the door. The various components of the bolt restraint may take different shapes and sizes while retaining their functionality. For example, the bolt may have sizes other than those described here and other components may be correspondingly adjusted. The housing may also take different shapes to those described here. For example, we described here that the back of the housing is a back plate, but shapes other than plate-like are possible. Correspondingly, the front portion of the housing may take other forms or may be made up of multiple parts. The front part and back plate may be reversed. Furthermore, variations in the actual shapes of the parts such as the bolt, catch plate and release trigger may be made without diverging from the general scope of the present invention.

The invention claimed is:

1. A bolt restraint mechanism for restraining a bolt of a bolting mechanism, the bolt restraint mechanism comprising:

a bolt moveable between thrown and retracted positions;

a catch plate having (a) edges outlining an aperture through which the bolt extends and (b) acting as a restraint surface, the catch plate biased to pivot such that the restraint surface pushes against the bolt to restrain movement of the bolt; and a release trigger arranged such that when depressed the release trigger pushes against the catch plate to pivot releasing the restraint surface from pushing against the bolt to release the bolt wherein the release trigger comprises a first end extending from a housing of the bolt restraint mechanism to be depressed and a second end arranged to push against the catch plate, wherein the release trigger is arranged for compression between the first end and the second end and biased against compression.

2. The bolt restraint mechanism of claim 1, wherein the catch plate is biased such that when the restraint surface pushes against the bolt to restrain movement of the bolt, the catch plate is non-orthogonal to the bolt.

3. The bolt restraint mechanism of claim 2, wherein the release trigger is arranged such that when depressed the release trigger pushes against the catch plate to pivot the catch plate towards crossing the bolt at an orthogonal angle.

4. The bolt restraint mechanism of claim 2, wherein when the catch plate restrains movement of the bolt the catch-plate is at an angle of up to 15 degrees to orthogonal to the bolt, or is at an angle of up to 10 degrees to orthogonal to the bolt, or is at angle of between 5 and 10 degrees to orthogonal to the bolt.

5. The bolt restraint mechanism of claim 1, wherein the catch plate is arranged to pivot and further arranged with limited translational movement.

6. The bolt restraint mechanism of claim 5, wherein the catch plate comprises a first male or female pivot member, and a housing of the bolt restraint mechanism comprises an opposing second female or male pivot member, wherein the first and second pivot members loosely fit together for rotational and limited translational movement of the catch plate relative to the housing.

7. The bolt restraint mechanism of claim 5, wherein the catch plate comprises one or two tangs, each tang located in a hole in the housing for rotational and limited translational movement of the catch plate.

8. The bolt restraint mechanism of claim 5, wherein the restraint surface of the catch plate is a first restraint surface, and the catch plate is further arranged for rotational and translational movement such that a second restraint surface opposite to the first restraint surface pushes against the bolt to restrain movement of the bolt, the second restraint surface pushing against an opposing side of the bolt to the first restraint surface.

9. The bolt restraint mechanism of claim 1, wherein the catch plate has a pivot axis and the aperture in the catch plate has a width transverse to the pivot axis which is greater than the width of the bolt at the aperture by an amount of no more than 1.0 mm.

10. The bolt restraint mechanism of claim 9, wherein the catch plate is biased at an end opposed to the pivot.

11. The bolt restraint mechanism of claim 1, wherein the restraint surface comprises a stepped surface.

12. The bolt restraint mechanism of claim 1, wherein the release trigger extends beyond a housing of the bolt restraint mechanism to be depressed by a door frame, strike-plate or keep.

13. The bolt restraint mechanism of claim 12, wherein the release trigger comprises a roller as the contact surface for depression of the release trigger.

14. The bolt restraint mechanism of claim 12, wherein an uncompressed length of the release trigger is adjustable.

15. The bolt restraint mechanism of claim 14, wherein the release trigger comprises (a) an adjustment screw or adjustment bolt and (b) an adjustment rod into which the adjustment screw or bolt couples, wherein one of the adjustment screw, the adjustment bolt or the adjustment rod comprises a head with chamfered surfaces, the head received in a hole with a plurality of chamfered countersink surfaces such that the adjustment screw, the adjustment bolt or the adjustment rod is keyed.

16. The bolt restraint mechanism of claim 1, wherein the release trigger comprises one or more springs between the first end and the second end for biasing the release trigger against compression.

17. The bolt restraint mechanism of claim 1, wherein the bolt has a square or rectangular cross-section having a length of a side of between 15.0 and 16.0 mm or between 25.0 and 26.0 mm.

18. A bolting mechanism comprising the bolt restraint mechanism of claim 1.

19. The bolting mechanism of claim 18, wherein the bolting mechanism is a multipoint bolting mechanism.

20. A door or leaf comprising the bolt restraint mechanism of claim 1 or the bolting mechanism of claim 18.

21. The door or leaf of claim 20, wherein the door or leaf is arranged to close within a frame and the bolt is arranged to be received in a hole in the door frame, or in a receiver or keep attached to the door frame.

22. A bolt restraint mechanism for restraining a bolt of a bolting mechanism, the bolt restraint mechanism comprising:

a bolt moveable between thrown and retracted positions;

a catch plate having edges (a) outlining an aperture through which the bolt extends, and (b) acting as a restraint surface, the catch plate biased to pivot such that the restraint surface pushes against the bolt to restrain movement of the bolt; and a release trigger arranged such that when depressed the release trigger pushes against the catch plate to pivot releasing the restraint surface from pushing against the bolt to release the bolt wherein the release trigger comprises (i) an adjustment screw or adjustment bolt and (ii) an adjustment rod into which the adjustment screw or bolt couples, wherein one of the adjustment screw, the adjustment bolt or the adjustment rod comprises a head with chamfered surfaces, the head received in a hole with a plurality of chamfered countersink surfaces such that the adjustment screw, the adjustment bolt or the adjustment rod is keyed.

* * * * *